United States Patent [19]

Tomantschger et al.

[11] Patent Number: 5,300,371
[45] Date of Patent: * Apr. 5, 1994

[54] MANGANESE DIOXIDE POSITIVE ELECTRODE FOR RECHARGEABLE CELLS, AND CELLS CONTAINING THE SAME

[75] Inventors: Klaus Tomantschger; Christopher Michalowski, both of Mississauga, Canada

[73] Assignee: Battery Technologies Inc., Richmond Hill, Canada

[*] Notice: The portion of the term of this patent subsequent to Apr. 28, 2009 has been disclaimed.

[21] Appl. No.: 49,405

[22] Filed: Apr. 20, 1993

Related U.S. Application Data

[60] Continuation-in-part of Ser. No. 824,208, Jan. 22, 1992, Pat. No. 5,204,195, which is a division of Ser. No. 497,908, Mar. 23, 1990, Pat. No. 5,108,852.

[51] Int. Cl.$^5$ .................... H01M 2/18; H01M 4/62
[52] U.S. Cl. .................... 429/60; 429/66; 429/164; 429/232
[58] Field of Search .............. 429/66, 164, 224, 232, 429/60

[56] References Cited

U.S. PATENT DOCUMENTS

| | | | |
|---|---|---|---|
| 3,113,050 | 12/1963 | Kordesch | 136/123 |
| 3,530,496 | 9/1970 | Amano et al. | 136/30 |
| 3,716,411 | 2/1973 | Ogawa et al. | 136/30 |
| 4,091,178 | 5/1978 | Kordesch | 429/60 |
| 4,275,127 | 6/1981 | Ritterman et al. | 429/60 X |
| 4,312,928 | 1/1982 | Van Deutkom | 429/60 |
| 5,108,852 | 4/1992 | Tomantschger et al. | 429/164 X |
| 5,162,169 | 11/1992 | Tomatschger et al. | 429/59 |

Primary Examiner—Stephen Kalafut
Attorney, Agent, or Firm—Donald E. Hewson

[57] ABSTRACT

This invention teaches rechargeable manganese dioxide cells having alkaline electrolytes, zinc negative electrodes and manganese dioxide positive electrodes. In keeping with the present invention, the positive electrode is essentially unconstrained—that is, no cage is used in the cell to confine the positive electrode. During discharge of a rechargeable alkaline cell, the positive electrode may be inclined to swell, and during the charge cycle it may be inclined to contract or reduce its dimensions. However, the positive electrode is dimensioned so as to substantially fill the entire space allotted for it within the cell, while allowing for a slight accommodation for height-wise or longitudinal expansion or growth in bobbin cells. The positive electrode may include additives such as carbon or graphite to increase its electrical conductivity; hydrophobic agents such as PTFE, polyethylene or polypropylene to enhance the hydrogen permeability of the positive electrode and thereby lead to increased hydrogen recombination rates; and similar hydrophobic agents as well as hydrophillic additives to serve as lubricants and to reduce tool wear during manufacturing processes. Also, the discharge capacity of the negative electrode may be established so as to be in the range of from about 60% to about 120% of the theoretical one electron discharge capacity of the positive $MnO_2$ electrode.

49 Claims, 5 Drawing Sheets

MANGANESE DIOXIDE POSITIVE ELECTRODE FOR RECHARGEABLE CELLS, AND CELLS CONTAINING THE SAME

CROSS REFERENCE

This application is a continuation-in-part of application Ser. No. 07/824,208, filed Jan. 22, 1992, now U.S. Pat. No. 5,204,195 issued Apr. 20, 1993, which is a division of Ser. No. 07/497,908, filed Mar.23, 1992 now U.S. Pat. No. 5,108,852 issued Apr. 28, 1992.

FIELD OF THE INVENTION

This invention relates to rechargeable cells having manganese dioxide positive electrodes. In general, such cells are alkaline manganese dioxide-zinc cells; however, the present invention also contemplates cell systems having alkaline or other aqueous electrolytes and manganese dioxide positive electrodes, but having negative electrodes which may be metal hydrides or hydrogen or even iron, cadmium or lead.

This invention also relates to such rechargeable cells as described above, but which cells are arranged so that the theoretical discharge capacity of the negative electrode is established so as to be within the range of from about 60% to about 120% of the theoretical one electron discharge capacity of the MnO$_2$ positive electrode.

A particular feature of the present invention is that the MnO$_2$ positive electrode of the rechargeable cell is unconstrained. By "unconstrained", it is meant that there is no addition wire screen or "cage" which is provided to specifically mechanically constrain the positive electrode from changing its dimensions due to the tendency of manganese dioxide to swell during a discharge cycle—and to dimensionally contract during a charge cycle. Accordingly, cells in keeping with the present invention will generally exhibit high drain rate capabilities, as well as long cycle life.

BACKGROUND OF THE INVENTION

It must always be recognized and kept in mind that when cells have an alkaline electrolyte, negative electrodes as discussed above, and rechargeable manganese dioxide positive electrodes, they are assembled in their fully charged state. Accordingly, the first cycle to which any such cell is subjected in use is a discharge cycle, after which the cell is required to be recharged for subsequent use. This is, of course, in contradistinction to nickel cadmium (Ni/Cd) or nickel metal hydride (NiMeH) cells, which must first be charged before they are capable of being used. The present invention may extend to button cells, although the discussion is particularly directed to bobbin cells. In any event, any cell in keeping with the present invention is subjected to discharge when it is first put into use; and then to charge and discharge cycles. However, because of the tendency of manganese dioxide positive electrodes to swell on discharge, especially in the presence of an alkaline electrolyte, care must be taken to ensure that the positive electrode maintains its integrity and does not disintegrate or substantially swell in such a manner as to disturb the internal structure of the cell. Otherwise, the cell could be rendered ineffective for further use.

Generally, cells in keeping with the present invention have a manganese dioxide positive electrode—as discussed in greater detail hereafter—together with a negative electrode, a separator, and an alkaline electrolyte, all in a suitable container. The container is sealed by a suitable closure. In general, cells in keeping with the present invention will have a potassium hydroxide electrolyte which is 1N to 15N, and which may further have zinc oxide dissolved in it.

The separator which is used between the positive electrode and the negative electrode generally consists of an absorbent layer, which serves as an electrolyte "wick", and a barrier layer whose purposes is to prevent short circuits in the cell due to the growth of zinc dendrites which may otherwise extend between the positive electrode and the negative electrode. These properties are best obtained using a two-layer separator system, or a laminated separator.

When the negative electrode is zinc, it is generally a zinc powder mixed with a gelling agent. The gelling agent may be such as potassium polymethacrylate or polymethacrylic acid, carboxymethyl cellulose, starches, and derivatives thereof. Metallic corrosion inhibitors such as lead, cadmium, indium, gallium, bismuth, and even mercury in very small quantities, may also be included in the formulation of the negative electrode, as well as organic corrosion inhibitors, so as to reduce hydrogen gassing within the cell. Optionally, zinc oxide powder may also be included in the negative electrode formulation.

The discharge reaction of manganese dioxide is quite complex, and may proceed in various steps. A description of the manganese dioxide discharge mechanism in the presence of an alkaline solution that has been proposed by Kozawa is generally accepted, and is described in Chapter 3 of "Batteries", Volume 1, Manganese Dioxide—edited by K. Kordesch. The MnO$_2$ discharge curve has a sloping characteristic, indicating an homogenous phase reaction. The potential of the MnO$_2$ changes continuously while protons originating from the water of the electrolyte are introduced into the lattice of the manganese dioxide, according to the equation:

$$MnO_2 + H_2O + e^- = MnOOH + OH^- \qquad \text{(Equation 1).}$$

However, the MnO$_2$ lattice expands as an increasing number of protons are inserted into the lattice, and at a certain point during the discharge the discharge mechanism changes. After that time, the discharge may occur in a heterogenous phase reaction, according to the equation:

$$MnOOH + H_2O + e^- = Mn(OH)_2 + OH^- \qquad \text{(Equation 2).}$$

This second reaction step involves the dissolution of MnOOH in the form of $\{Mn(OH)_4\}^-$, with electrochemical reduction on the graphite additive found in the manganese dioxide positive electrode $Mn(OH)_4^=$, and the precipitation of $Mn(OH)_2$ from it.

Manganese dioxide electrodes, when used as rechargeable positive electrodes in electrochemical cells, are known to be rechargeable only if the manganese dioxide is charged and discharged no more than between its nominal status of MnO$_2$ and its fully discharged one electron status of MnOOH. For purposes of the present discussion, the theoretical discharge capacity of the MnO$_2$ electrode between the MnO$_2$ status and the MnOOH status is termed or designated as the theoretical one electron discharge capacity of the MnO$_2$ electrode. If the discharge process of the MnO$_2$ positive electrode continues beyond the MnOOH level, an irreversible phase change has been reported to occur, so that the manganese dioxide electrode is no longer fully rechargeable.

Specifically, Equation 1, above, is descriptive of the discharge reaction which takes place as the $MnO_2$ discharges towards its MnOOH one electron discharge level in the presence of an aqueous electrolyte. Generally, the theoretical one electron discharge capacity of $MnO_2$, as it follows the discharge reaction of equation 1, is considered to be 308 mAh/g of $MnO_2$. It must not be overlooked that during such discharge, the structure or lattice of the $MnO_2$ electrode expands or at least tends to expand.

Moreover, at a certain point of further discharge, the discharge mechanism may change; and after that point the discharge, which is in the second electron discharge level of the $MnO_2$ electrode, occurs following a heterogeneous phase reaction which is set forth in Equation 2, above. Particularly with reference to alkaline manganese dioxide/zinc cells, the second step described in Equation 2, above, occurs at a voltage which is too low to contribute significantly if at all to the service life of the cell, since it occurs below 0.9 volts. Generally, it is found that with practical cells formulations, the second discharge step described above is irreversible, thereby rendering the $MnO_2$ electrode to be non-rechargeable. Therefore, this second discharge step must be prevented from happening.

In other words, $MnO_2$ is, in principle, capable of giving up twice its one electron recharge capacity. However, the second electron discharge capacity of $MnO_2$, past its first electron discharge capacity, is not rechargeable in practical cells in any meaningful way, and occurs in any event at too low voltage to be useful.

With respect to prior art $MnO_2$/Zn cells, there have been a number of steps taken to ensure rechargeability; and specifically, steps have been taken to severely limit the discharge capacity of the negative electrode, or to provide electronic means to preclude overdischarge of the $MnO_2$ positive electrode, so as to provide rechargeable $MnO_2$/Zn cells. This has been particularly of concern when it was intended to provide $MnO_2$/Zn cells in sufficient quantities as to make them commercially viable, meaning especially that ordinary commercially available battery grade manganese dioxide had to be relied upon.

Of course, it is generally to be noted, as well, that it is the $MnO_2$ electrode that provides the difficulty as to rechargeability; it being generally known that it is the material of the negative electrode that is rechargeable over most if not all of the cycle life of the cell.

Historically, rechargeable alkaline $MnO_2$/Zn cells that have been brought to the market in the late 1960's and early 1970's were not successful because of the constraints placed upon them. Those constraints were, as noted above, the use of electronic controls to determine the end of the discharge—that is, to cut off the discharge at a certain point—or even placing the onus on the user of the cell to keep records of the amount of use that the cells were put to, and then to place the cells in the charger for recharging at an appropriate time—which must be neither too early nor too late. In general, such cells were merely modified primary alkaline $MnO_2$/Zn cells, and generally they had the same ratio between the active materials in the negative electrode and positive electrode as primary cells but merely employed binders such as cement to preclude structural failure of the $MnO_2$ electrodes, as well as additives to suppress gas formation, and of course improved separators to preclude the chance of shorting between the negative electrode and positive electrode. Such cells were also quite low in respect of their energy densities: for example, a D cell may have been rated at only 2 Ah as a rechargeable cell, and it could deliver a total of only 6 Ah before the cell was completely exhausted and not further rechargeable. In such cells, the theoretical capacity of the zinc negative electrode was generally set higher than that of the theoretical one electron discharge capacity of the $MnO_2$, at about 125% to 135% of the theoretical one electron discharge capacity. A more full discussion of the above is found in FALK and SALKIND *Alkaline Storage Batteries*, published by John Wiley & Sons, New York, 1969, at pages 180 to 185, and also pages 367 to 370.

Kordesch, in U.S. Pat. No. 2,962,540 describes cement bonded anodes for use in single use dry cells. The positive electrodes may have bobbin configuration, or plate configuration, and the structure of the positive electrodes is such that they are integrally united with 5% to 20% of cement additives. Optionally, a further 2% to 20% of steel wool may be employed as further cathode reinforcement. The purpose of the patent is to overcome the electrical resistance that is noted in unbonded positive electrodes, which electrical resistance is caused by the expansion of the positive electrode during discharge.

In U.S. Pat. No. 3,113,050, Kordesch describes positive electrodes that may be used in both primary and rechargeable cells. Those positive electrodes are cement and latex bonded so as to reduce expansion and contraction during discharge and charge cycles. The cement and latex binder additives are each present in the range of from 2.5% to 20%. An additional 2% to 20% of cement and/or latex binder additives can additionally be incorporated.

Alternatively, so as to overcome the limitations noted above, cells were developed by which the discharge capacity of the cell was limited by imposing negative electrode limitation on the capacity of the cell—by which it was made impossible to discharge the $MnO_2$ to more than a predetermined amount because of the available capacity of the negative electrode. Generally, that meant that the discharge capacity of the zinc negative electrode was allowed to become no more than about 30% of the theoretical one electron discharge capacity of the $MnO_2$ positive electrode. This, at least, preserved the rechargeable characteristics of the cell, but resulted in a cell having quite low deliverable energy capacity and density. Those limitations, understandably, mitigated against the commercial acceptability of such cells.

Reference is made to Amano et al U.S. Pat. No. 3,530,496, issued Sep. 22, 1970. Amano et al make a very strong statement of their intent to limit the depth of discharge of the $MnO_2$ electrode by providing a negative electrode that has its capacity limited to between 20% to 30% of the theoretical one electron $MnO_2$ discharge capacity. Amano et al prevent the mechanical failure of the positive electrode through the addition of nickel powder, which also increases the electrical conductivity of the positive electrode, and as well significantly enhances its mechanical strength. By adding nickel powder to the positive electrode, Amano et al observed a diminished tendency of the positive electrode to swell and to peel or delaminate. However, according to Amano et al, without the addition of a reinforcing agent such as the nickel powder, which acts as a binder for the positive electrode, the electrode can only be discharged to about 20% of its theoretical one electron capacity without experiencing mechanical failure of the positive electrode. As the positive electrode is only discharged to such a shallow depth, the expansion and contraction of the electrode during cycling are not extensive enough so as to cause mechanical failure. Amano et al have reported that the addition of nickel binder and graphite in a weight ratio of $MnO_2$:graphite:nickel of 8:1:1 increases the cycle life of the positive electrode having negatie electrodes that have capacities up to about 30% of the theoretical one electron discharge capacity of the $MnO_2$ positive electrode. Amano et al also report that the nickel additive reduces "spring back" action of the pre-molded cathode pellets as they are released from the molding die.

How Amano et al achieve their zinc negative electrode limitations is that they provide positive electrodes having dimensions that are essentially equal to those of primary alkaline cells, and then reduce the zinc capacity of the negative electrodes by placing an annular or hollow cylindrical gelled zinc negative electrode adjacent to the $MnO_2$ positive electrode and separated from it by a suitable two component separator. Then, the center of the negative electrode is filled with gelled electrolyte that does not have any active negative electrode material added to it. Amano et al also prefer that amalgamated copper particles be included in the negative electrode so as to enhance its conductivity. Moreover, in the negative electrode Amano et al also provide a zinc oxide reserve mass, they employ PTFE as a binder, and they must use a perforated coated screen current collector rather than a single nail which would otherwise be used in a primary $MnO_2$/Zn alkaline cell.

Ogawa et al, in U.S. Pat. No. 3,716,411, issued Feb. 13, 1973, teach a rechargeable alkaline manganese cell, the discharge capacity of the negative electrode of which is controlled within such a range that the positive electrode can be recharged; and wherein the negative electrode and positive electrode face each other through a gas permeable and dendrite impermeable separator. However, the Ogawa et al cell is strictly negative electrode limited in that the capacity of the negative electrode is held to be not more than about 40% of the theoretical one electron discharge capacity of the manganese dioxide. Ogawa et al discuss the fact that if a zinc-manganese dioxide cell is discharged so that its terminal voltage reaches a voltage below 0.9 volts and down to about 0.75 volts, and where the capacity of the zinc negative electrode is about the same or slightly smaller than that of the manganese dioxide positive electrode, then the effect of the discharge on the manganese dioxide is such that it is non-reversible at least in part. Ogawa et al insist that under no conditions should the depth of discharge of the negative electrode be permitted to exceed 60% of the theoretical one electron discharge capacity of the manganese dioxide positive electrode. Ogawa et al provide an alternative structure which comprises two positive electrodes, one on either side of the negative electrode, and wherein the inner positive electrode is contained within a perforated nickel plate steel pocket or canister.

It should be noted that Ogawa et al also describe an $MnO_2$ positive electrode for secondary cells using a carbonyl nickel binder in an approach that is similar to the one described by Amano et al. Moreover, Ogawa et al utilize an unusually thick separator, having a thickness of between 0.5 and 4 mm, with the anticipation that the thick separator will provide a confinement to preclude swelling of the positive electrode in a manner similar to the metal cages used by Kordesch et al in U.S. Pat. No. 4,384,029, described below. The negative electrode employed by Ogawa et al is formed by applying a paste which contains zinc particles to a copper net or screen, which serves as the current collector. However, the negative electrode is so viscous and stiff that it must be kneaded before it is inserted into the cell. Still further, the metal screen also provides confinement for the positive electrode so as to constrain its tendency to swell during charge and discharge cycling.

Tomantschger et al, in a commonly owned U.S. patent application Ser. No. 07/893,793 filed Jun. 4, 1992, provide rechargeable alkaline manganese zinc cells that utilize an $MnO_2$ positive electrode and a zinc negative electrode, wherein the negative electrode capacity of the zinc is limited to greater than 60% and up to 100% of the theoretical one electron discharge capacity of the $MnO_2$. That provides a rechargeable alkaline manganese cell having higher capacity and higher energy density than has been available from the prior art cells.

What the present invention provides is cells with a manganese dioxide electrode, and which have a high capacity and a high drain capability relative to prior art cells. A negative electrode is provided, with a separator between the negative electrode and the $MnO_2$ electrode, together with appropriate terminal means contacting the negative electrode and $MnO_2$ electrode so as to provide respective negative and positive terminals for the cell. The manganese dioxide of the unconstrained $MnO_2$ electrode is capable of being charged and discharged at or below the theoretical one electron discharge capacity of the $MnO_2$ electrode, which is between the $MnO_2$ status and the MnOOH status.

In its broadest terms, the present invention contemplates negative electrodes where the principal active component may be chosen from the group consisting of zinc, hydrogen, and metal hydrides. Other elements such as iron, lead, or cadmium might also be considered under certain conditions for special use purposes. The principal component of the aqueous electrolyte is chosen to accommodate the specific couple between the negative electrode and the positive $MnO_2$ electrode, and particularly may be chosen from the group consisting of alkali metal hydroxides—e.g., KOH—or an acid such as $H_2SO_4$, $H_3BO_3$, or $H_3PO_4$, or mixtures thereof; or a solution of salt which may be $ZnCl_2$, $NH_4Cl$, or KCl, or mixtures thereof. The negative electrode is, of course, rechargeable.

In keeping with the provisions of the present invention, the theoretical discharge capacity of the negative electrode is in the range of from 60% to 120% of the theoretical one electron discharge capacity of the $MnO_2$ electrode. In other words, the electrode balance of cells in keeping with the present invention is in the order of from 60% to 120%.

In a typical embodiment of cells according to the present invention, where the cells are intended for commercial exploitation, the active material of the negative electrode is zinc, and the electrolyte is 1N to 15N potassium hydroxide.

Cells according to the present invention may have a number of additives for purposes of enhancing the performance of the $MnO_2$ positive electrode, or for catalyzing oxygen evolution or hydrogen recombination, or for ease of $MnO_2$ electrode manufacturing processes, and so on. The $MnO_2$ electrode may include at least one electrically conductive additive which is chosen from the group consisting of 5% to 15% by weight of graphite, and 0.1% to 15% by weight of carbon black. The carbon black may be present as a porous additive in the $MnO_2$ electrode.

The addition of various barium compounds such as barium oxide, barium hydroxide, and barium sulphate in the range of from 3% to 25% may also be desired. The use of the barium compounds results in an increased cycle life and in an improved cumulative capacity of the cell.

To promote hydrogen gas recombination within the positive electrode, the electrode composition may include hydrogen recombination catalysts such as those taught in commonly owned U.S. Pat. No. 5,162,169 issued Nov. 10, 1992. The $MnO_2$ electrode may comprise from 0.01% to 5% of a hydrogen recombination catalyst such as one chosen from the group consisting of silver, oxides of silver, silver salts, platinum, and compounds of silver and platinum.

Alternatively, the addition of a wet proofing agent such as from about 0.1% to about 3% and up to 5% of PTFE, polyethylene, or polypropylene, will enhance the gas transport within a single use or a rechargeable $MnO_2$ positive electrode to such an extent that, as noted above, significant hydrogen recombination rates can be obtained even with uncatalyzed $MnO_2$ electrodes. Moreover, the addition of porous additives such as acetylene black in the range of from about 0.1% to about 15%, especially if those additives have been rendered hydrophobic, also greatly enhances the gas transport capabilities of the positive electrode. It follows that the combination of a partially hydrophobic positive electrode which further employs wet proofed porous additives and which may also include a hydrogen recombination catalyst, will provide for the maximum hydrogen gas recombination rates.

Alternatively, carbon black may itself be wet proofed by treating it with PTFE. Such a product is available under the trade mark TAB-1 from IBA Shipping Center, of Torrance, Calif. The TAB-1 material is an acetylene black which has been rendered hydrophobic by the application of PTFE, and it has been developed for use in gas diffusion electrodes. Indeed, this product has been found to be well suited for maintaining gas permeability within a $MnO_2$ primary or secondary electrode, thereby significantly enhancing the hydrogen gas permeation characteristics of the positive electrode.

Still further, so as to provide for overchange capability, an oxygen evolution catalyst as taught in commonly owned U.S. Pat. No. 4,957,827, issued Sep. 18, 1990, to Kordesch et al, may be utilized. Whatever catalyst is selected, it is chosen so as to be stable over a wide voltage range—typically from 0.75 volts versus Zn to 2.0 volts versus Zn—and also over a wide temperature range—typically from $-40°$ C. to $+70°$ C.—without any significant deterioration in performance of the cell. Such catalysts may be oxides, spinels, or perovskites of nickel, cobalt, iron, manganese, chromium, vanadium, titanium, and silver. As taught in U.S. Pat. No. 4,957,827, an oxygen evolution catalyst may be placed on the outer surface of the positive electrode, or it may be dispersed throughout the $MnO_2$ electrode.

By adding lubricants to the positive electrode, a number of desirable effects can be achieved. In particular, the moldability of the positive electrode may be increased, and as well the amount of wear on the tools used for processing and manufacturing the positive electrode may be decreased. Moreover, it is well known that there is a "spring back" phenomenon which accompanies manufactured positive electrodes, where the positive electrode pellet will increase its size somewhat after it has been removed from the pellet press but prior to it being inserted into the cell. "Spring back" phenomenon can be significantly suppressed by using lubricants added to the positive electrode. The lubricants that have been tried are metal salts of stearic acid, or polyethylene, polypropylene, PTFE, or other polymeric materials which are otherwise benign when added to the positive electrode formulation. Such lubricant additives may be typically employed in concentrations of between 0.1% to about 3% and up to 5%, based on the weight of the positive electrode. It should be noted that such lubricant additives are becoming increasingly important in the case of low mercury or mercury free zinc $MnO_2$ cell; and this is because any impurity which is introduced into the cell as a consequence of tool wear will generally increase the hydrogen gassing that may be experienced with the negative electrode of the cell. For example, it has been found that iron introduced into the positive electrode as a consequence of tool wear are may be fairly mobile within the cell electrolyte, so that it may eventually find its way to the zinc negative electrode of the cell. There, the presence of iron will suppress the hydrogen over-potential on zinc, and consequently it will enhance hydrogen generation within the cell.

Depending on the nature of the cell, the positive electrode may be molded into pellets and inserted into the can, followed optionally by recompaction. Otherwise, the positive electrode may be extruded directly into the can, or it may be rolled or cast as a flat electrode for use in spirally wound cells or even in respect of button or coin cells.

In any event, regardless of the specific nature of the positive electrode that are inserted into the can, it has been found that the application of a conductive carbon based coating to the inside surface of the can will provide a significant benefit in at least two respects. First, the effort required for pellet insertion or extrusion of a positive electrode into the can may be significantly reduced, and moreover, the electrical contact which is made between the can and the positive electrode is improved so that there will be a reduced internal resistance noted in the cell throughout its cycle life. Still further, an increased short circuit current for the cell will be achieved, and there will be better performance of the cell after extended periods of storage. A suitable can coating dispersion is available from Lonza Ltd. of Sins, Switzerland, under the product designation LGV 1188; and it provides a 43% aqueous dispersion of graphite and a polyvinylacetate co-polymer.

It has been well shown that a manganese dioxide positive electrode expands during discharge and contracts during charge. Kordesch et al in Electrochemica Acta 25 (1981) at 1495 to 1504, have shown that cycling an unconfined binderless manganese dioxide positive electrode resulted in electrode failure in just four discharge/charge cycles, due to its bulging and mechanical disintegration. For totally confined electrodes, 30 to 40 cycles were reported when various commercially available electrochemical manganese dioxide (EMD) were employed, and where the positive electrode was discharged only up to no more than 35% depth of discharge based on the theoretical one electron capacity of the positive electrode. Kordesch et al concluded that the failure mode was not a consequence of the build up of an insulating layer on the manganese dioxide electrode, but due to a mechanical disintegration of the electrode accompanied by a resistance increase of the electrode.

Kordesch et al also demonstrated in half cell experiments that if a similar electrode was confined by a perforated disk under pressure, the confined electrode continued its cycling life well beyond the fourth cycle; and moreover, that the change in dimension between the charged and the discharged electrode was only about half of that which occurred in the unconfined electrode. It was demonstrated that a mounting pressure of about 250 to about 750 N/cm$^2$ was required to increase the cycle life from less than about 5 cycles—noted, above, to be because of poor conductivity and mechanical disintegration—to at least 75 cycles. A peak of 92 cycles was found at 500 N/cm$^2$. However, it was also found that at higher mounting pressures, the cycle life would drop because of the loss of pore volume within the manganese dioxide electrode, thereby creating problems with respect to electrolyte penetration within the electrode.

When a manganese electrode is in the form of a sleeve or a disk, additional difficulties may arise. The internal resistance of the electrode may increase, and the mechanical disintegration of the electrode may be particularly severe. Kordesch, in "Batteries", Volume 1 at pages 201 to 219 discusses these problems. Several prior art references show attempts to preclude the expansion of a manganese dioxide electrode during discharge and, indeed, to try to prevent its contraction during charge. Such prior art attempts have included the addition of a binder such as cement (U.S. Pat. No. 2,962,540); the addition of graphitized textile fibres (U.S. Pat. No. 2,977,401); the addition of latex binders (U.S. Pat. No. 3,113,050); the use of combination binders such as cement and steel wool (U.S. Pat. No. 3,335,031); and the use of supplementing binders (U.S. Pat. No. 3,945,847), all as discussed above. None of those patents, however, could preclude the mechanical disintegration of the manganese dioxide electrode over many cycles, apparently due to the limited binding strength of the materials being used.

Kordesch and Gsellman in U.S. Pat. No. 4,384,029 issued May 17, 1983, teach cylindrical bobbin cells which may use mechanical enclosures such as tubes, springs, mechanical wedges, and perforated cylinders, to preclude expansion of the cathode during discharge of those bobbin cells. What that patent attempts to do is to create a constant volume manganese dioxide positive electrode, which means that the electrode must always be under a certain mounting pressure at all times. The patent suggests that by increasing the mounting pressure, the number of useable cycles for the cell will increase. By providing the metal cage, which is essentially rigid, the tendency of the manganese dioxide electrode to swell creates internal pressure within itself, which acts against the metal cage and between the cage and the can, thereby counteracting the tendency to swell; and by maintaining the manganese dioxide electrode under pressure, the electrode retains a substantially constant volume during discharge as well as charge.

A different approach, using combinations of binders with a mechanical retainer of multiple mechanical retainers is disclosed in a further patent which is commonly owned herewith, being U.S. Pat. No. 4,957,827 issued Sep. 18, 1990 in the names of Kordesch, Gsellman and Tomantschger.

While the two Kordesch et al patents noted immediately above show the use of means such as cages to accomplish rechargeable cells having cycle lives of up to several hundred cycles, there are also several disadvantages from the approaches taken in the two Kordesch et al patents that must be considered. In particular, where cement or other non-conductive binders are used, they are present in the range of typically 5% to 10%, or even up to about 20%, by volume of the manganese dioxide electrode, and therefore the quantity of active ingredient that can be placed in the electrode is reduced. This results, of course, in a decrease in the useable discharge capacity of the cell, and it may also result in a decrease in the conductivity of the manganese dioxide electrode. On the other hand, if an insufficient amount of binder is used, then typically the manganese dioxide electrode may tend to crumble and/or crack, so that a coherent electrode structure is not achieved and its integrity is seriously affected.

If mechanical structures such as cages or screens are employed, then there is a significant increase in the material cost of the cell, as well as a significant increase in the cost of assembly of the cell. Indeed, there may be a significant effect and complication with respect to the use of high speed production equipment. Moreover, the use of a mechanical component such as a perforated iron or copper cage or plate may significantly increase the probability of cell gassing within the cell.

Still further, the use of a mechanical cage of screen adjacent to the separator of the cell may significantly affect the capability of the cell to operate in high drain conditions. Any mechanical means which restricts the electrode interface between the positive electrode and the negative electrode will act to limit the current density achievable from within the cell.

In contradistinction to the prior art, which relied upon the use of mechanical structures such as cages or screens, or the use of binders such as cement and steel wool, commonly owned U.S. Pat. No. 5,108,852 issued Apr. 28, 1992 to Tomantschger and Michalowski describes the use of an unconstrained manganese dioxide electrode for use in rechargeable galvanic cells. There is no cage or screen, and the patent is directed to the manner in which the positive electrode is constrained from significantly changing its dimensions by essentially filling the entire space allotted for it within the cell, while permitting perhaps a slight accommodation for height-wise or longitudinal expansion or growth in bobbin cells, or crosswise expansion or growth in button cells. Certain additives are contemplated for use in the manganese dioxide electrode mix, including conductive fibres or graphite and optionally including metal-based additives.

PURPOSES OF THIS INVENTION

The present inventors have found that, quite unexpectedly, the mechanical integrity of a manganese dioxide positive electrode can be maintained during cycling, without the necessity for any physical confinement of the manganese dioxide electrode, or the necessity for using large amounts of binders. This may be especially true if the cell employing the manganese dioxide electrode is "anode limited" with respect to the discharge capacity of the negative electrode: that is, that the cell is arranged so that the theoretical discharge capacity of the negative electrode is in the range of from about 60% to about 120% of the theoretical one electron discharge capacity of the MnO$_2$ electrode. That means, therefore, that the present invention provides a cell having an unconstrained manganese dioxide electrode.

However, the present invention achieces its purpose of providing an unconstrained positive electrode by a variety of ways. It may achieve that purpose by restricting the positive electrode from significantly changing its dimensions during discharge by, essentially, filling the entire volume within the cell intended for the positive electrode and thereby leaving essentially no void above the positive electrode between the top of the electrode and the closure of the cell. Various examples will be discussed hereafter, showing one or more of the above approaches.

Indeed, the present invention has shown that, although there may be changes in the dimensions of the positive electrode during cycling—expansion during discharge, contracting during charge, as noted above—and that while the overall size of the positive electrode may slowly increase as the number of recharge cycles which the cell has been subjected increases, the present invention does provide a positive electrode for use in a cell which exhibits at least equivalent operating characteristics, or better operating characteristics, than any of the prior art cells which employ binder materials or mechanical components are noted above.

It is determined that with an unconstrained cylindrical or sleeve-type positive electrode in a cylindrical, spirally wound or bobbin cell, and a disc positive electrode in a coin or button cell, the positive electrode structure may be subjected to a variety of forces as the cell is being cycled. Particularly during discharge, the tendency of the positive electrode to swell is inhibited by the metal can or container within which the cell is assembled. It appears that the tendency for the positive electrode of a bobbin cell to expand inwardly towards the negative electrode is significantly reduced, which may in part be due to the sleeve geometry and due to the presence of the separator and the cylindrical negative electrode within it. What also appears to be the case is that the tendency for the manganese dioxide positive electrode to swell may be substantially linear in all directions; and since the electrode is significantly longer in length or higher than its thickness or the width of its annulus, the expansion of the electrode during discharge will for the most part be longitudinal—that is the height of the positive electrode will increase significantly more than the width or thickness of the annulus, and the amount of that increase is in some way related to although it may be greater than the ratio of the initial height and width of the positive electrode.

However, in keeping with the present invention, there is substantially little void space within the cell. In general, the void space may be between about 2% to about 15% of the volume of the cell. To all intents and purposes, the positive electrode is restricted from significantly changing its dimensions during discharge by interference at its outer periphery with the can (which may be a coated can), and at its bottom with the cell can or with any separator or insulator disk that may be located in the bottom of the can. Further interference of the positive electrode may be encountered at its inner periphery with the separator of the cell; and also by interference at the top of the positive electrode with the closure member for the cell. Of course, there may still remain some void or gas volume within the cell between the top of the positive electrode and the closure.

Optionally, cells that are otherwise in keeping with the present invention may further comprise the addition of a small amount of fibres to the electrode mix, usually but not necessarily conductive fibres. Examples will be shown of cells having cycle life which has heretofore only been possible by the use of mechanical structural components such as cages, or by the use of binders such as cement, and of course the advantages of cells of the present invention are particularly the provision of greater cell capacity and the capability of the cell to operate under high discharge rate conditions—as well as decreased production costs.

BRIEF DESCRIPTION OF THE DRAWINGS

The first two figures which accompany the following discussion are representations of typical cells in keeping with the present invention. In this instance.

Figure 1:
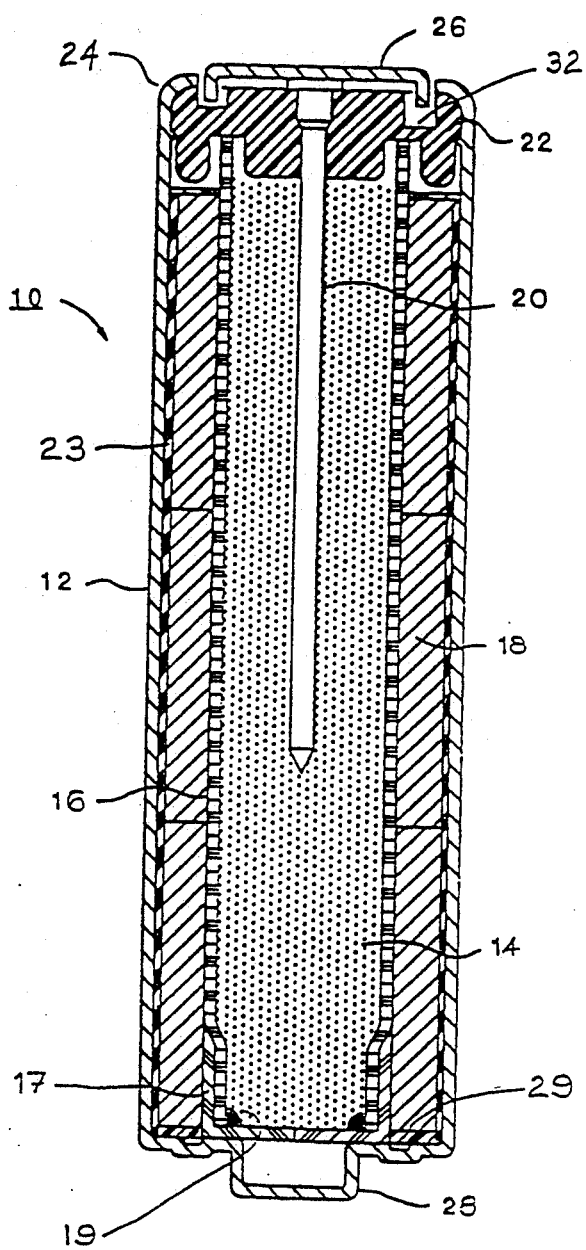
FIG. 1 shows a typical manganese dioxide-zinc cell of the present invention in the AA size.
Figure 2:
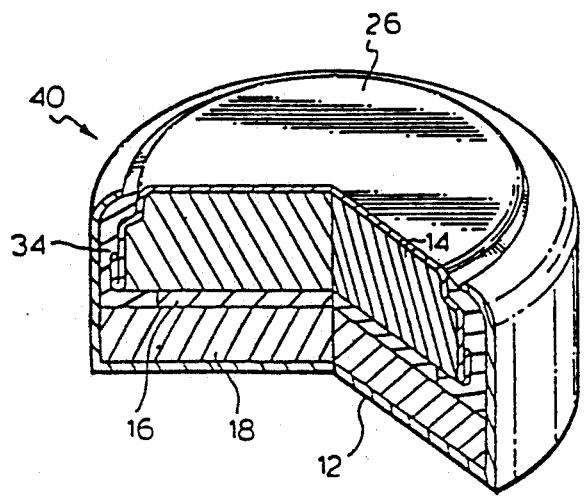
FIG. 2 shows a typical construction of a coin or button cell of the present invention.

DESCRIPTION OF THE PREFERRED EMBODIMENTS:

First, having regard to FIGS. 1 and 2, typical cell structures for a bobbin cell 10 and coin or button cell 40 are shown. For ease of discussion, similar cell components are shown having identical reference numerals. Each cell includes a container or can 12, which may be nickel plated steel or any other convenient can of the sort generally used for the manufacture of primary or secondary cells. Within the can 12 there is a negative electrode 14, a separator 16, and a positive electrode 18. Typically, the separator may be a single layer, or it may be a dual layer having an absorbent layer and an ion permeable barrier layer, or the absorbent and ion permeable layers may be laminated together. Generally, the electrolyte absorbent layer is a non-woven material which may optionally be one which is fibre reinforced. For ease of production, laminated separators—which combine the absorbent layer and the barrier layer—or microporous separators such as CELGARD TM provided by Hoechst Celanese—where the smaller pore dimensions are generally below 0.2 microns—are preferred.

For bobbin cells such as that shown in FIG. 1, the general construction of a separator is either that of a preformed tube, or it may be wound from pre-cut strips of separator material around a mandrel; and in either event, the substantially cylindrical separator is inserted into the cell. So as to preclude a short circuit developing at the bottom of the negative electrode against the cell container, a bottom disk or cup of insulating material such as polyethylene is placed at the bottom of the cell, such as the insulating cup shown at 17. Optionally, a hot melt or other thermoplastic sealant such as asphalt may be applied as a bead 19, to ensure against any likelihood of short circuit developing at the seam between the bottom of the separator 16 and the insulating cup 17. If the separator is a tubular structure, the bottom may be sealed simply by applying sufficient thermoplastic sealant at its bottom to prevent electrical contact between the negative electrode 14 and the cell container or can 12.

As noted above, the separator may consist of two layers, the first being an electrolyte absorbent layer and the second being a barrier layer which is capable of preventing zinc dendrite formation, but which retains its ionic permeability characteristics. The material of the first layer may be an absorbent cellulosic or polymeric material; the second layer may be an ion permeable material such as CELLOPHANE TM, or DELFEI 55/50 TM manufactured by Oy Visco of Finland. Alternatively, a single structure such as CELGARD TM, noted above, is capable to perform both zinc dendrite formation and electrolyte absorption functions.

In the bobbin cell 10, a nail or current collector 20 extends downwardly into the negative electrode 14. The nail 20 pierces and extends through the cell closure 22. The cell is sealed by crimping such as at 24. Typically, the nail or current collector 20 is made of brass or bronze. In some cases, particularly with larger C and D sized cells, the current collector may take the form of a tube or a split tube or a half-tube.

Each cell has a negative cap 26 associated with and in electrical contact with negative electrode 14, either directly or, in the case of the bobbin cell 10, through the nail or current collector 20. In a usual embodiment of a bobbin cell such as that shown in FIG. 1, the positive terminal is a pip 28 formed in the can 12; with the insulative cup 17 being placed below the negative electrode 14; and in the embodiment shown, the separator 16 extends down into the insulative cup 17, which protects the negative electrode from coming into contact with the can 12 or the positive electrode 18. There may be a can coating 23 on the inner surface of the can 12, between the can and the negative electrode 14; and in some embodiments of bobbin cells, there may be a polymer insulative disk 29 located at least at the bottom of the negative electrode 14 between it and the bottom of the can. The insulative cup 17 may be dispensed with when the insulative disk 29 is utilized and it extends across the bottom of the negative electrode 14, but care must be taken as noted above to ensure that there is no likelihood of a short circuit developing between the negative electrode and the can, or between the positive and negative electrodes. Optionally, the insulative disk 29 may extend across the entire bottom of the can 12, in which case also use of the insulative cup 17 may be dispensed with. There is usually a hot melt seal applied at the bottom of the separator where it meets the disk.

It will be noted in the embodiment of FIG. 1 that the separator 16 may extend up to contact and interfere with the bottom surface of the closure member 22. A relief membrane 32 is shown moulded into the closure member 22, and it is intended to burst at a predetermined pressure in the event of a significant build up of internal gas pressure within the cell.

The coin or button cell 40 uses the can 12 as its positive terminal; and it is crimped over the grommet 34 so as to insulate the positive and negative terminals of the cell from each other.

What the present invention provides, therefore, is a rechargeable electrochemical cell having a container 12, a negative electrode 14, a separator 16, and a manganese dioxide positive electrode 18. There is an ion conductive aqueous electrolyte present within the cell, providing the ion transfer medium for current to flow between the positive electrode and the negative electrode, and a closure member 22 or grommet 34 which is also a closure member. As noted, all of the internal components are sealed within the container.

In keeping with one provision of the present invention, the positive electrode of a bobbin cell is restricted from significantly changing its dimensions during discharge by interference at its outer periphery and its bottom with the internal surfaces of the container 12, at its inner periphery by interference with the separator 16, and sometimes at its top by interference with the underside of the closure member 22. The positive electrode of a coin or button cell is likewise restricted by the container 12 and separator 16. The preceeding description is general, in that there may be other elements present such as the can coating on the inside surface of the can or a disk at the bottom of the positive electrode.

Usually, as noted, the negative electrode may be zinc; but it may in certain circumstances be chosen from any one of the group consisting of zinc, hydrogen, iron, cadmium, lead, and metal hydrides. Also, as noted above, when the negative electrode is essentially comprised of zinc, it is generally a zinc powder mixed with a gelling agent. The gelling agent may be such as potassium polymethacrylate or polymethacrylic acid, carboxymethyl cellulose, starches, and derivatives thereof. Metallic corrosion inhibitors such as lead, cadmium, indium, gallium, bismuth, and even mercury in very small quantities, may also be included in the formulation of the negative electrode, as well as organic corrosion inhibitors, so as to reduce hydrogen gassing within the cell. As noted above, zinc oxide powder may also be included in the negative electrode formulation.

In general, bobbin cells according to the present invention are cylindrical, having the positive electrode in the form of a single annulus or a series of rings or pellets, and a cylindrical negative electrode axially placed within the electrode. Coin or button cells have both the positive electrode and negative electrode in the form of a disc or wafer.

It is usual, and will be shown in examples below, that the positive electrode may have certain additives admixed to its formulation. In general, from about 1% to about 20% by weight of the positive electrode is the alkaline electrolyte—generally 1N KOH to 15N KOH.

Still further, in general the positive electrode will contain a small amount of graphite—usually in the amount of from about 2% to about 20% by weight of the electrode—to increase the electrical conductivity characteristics thereof.

Moreover, the positive electrode may contain a small quantity of conductive carbon such as carbon black or other equivalent conductive carbon materials, generally in the range of from about 0.1% to about 20% by weight of the electrode.

As noted above, a further formulation of the positive electrode according to the present invention may provide for the addition of a small quantity of fibres to the positive electrode. In general, those fibres are conductive, and they may be chosen from the group consisting of carbon fibres, graphite fibres, carbon fibres plated with nickel, carbon fibres plated with silver, graphite fibres plated with nickel, graphite fibres plated with silver, copper fibres plated with nickel, and copper fibres plated with silver. The fibres (which are milled carbon fibres and/or chopped carbon fibres) will generally have a length of from about 100 microns up to about 5 centimeters; a typical fibre is CARBO-FLEX ™ provided by Ashland Carbon Fibres of Ashland, Ky. The fibres, especially conductive fibres, may typically be present in the positive electrode in the amount of from about 0.1% to about 3% or even up to 5.0% by weight thereof.

As noted above, yet a further embodiment of the present invention is for an unconstrained positive electrode having as an admixture thereto a small quantity of a barium compound. Generally, a barium-based additive may be present in the amount of from about 3.0% to about 25% by weight of the positive electrode. The addition of the barium based additive has been found to have a beneficial effect on the cycle life of the cell.

The present invention also provides a method of preparing a positive electrode mix for use in a rechargeable alkaline electrochemical cell, where the cell is substantially as described above. As noted, the cell will comprise internal components which include a positive electrode, a negative electrode, a separator, and an alkaline electrolyte; and those internal components are sealed within the container by a closure member.

Further, as noted, the positive electrode mix will generally comprise manganese dioxide, together with from about 1% to about 20% by weight thereof of the alkaline electrolyte—usually 1N to 15N KOH; and optionally from about 2% to about 20% by weight thereof of graphite; and optionally from about 0.1% to about 20.0% by weight thereof of conductive carbon; and optionally from about 0.1% to about 3.0% or up to 5.0% by weight thereof of conductive fibres which may be chosen from the group consisting of carbon fibres, graphite fibres, carbon fibres plated with nickel or silver, graphite fibres plated with nickel or silver, or copper fibres plated with nickel or silver; and optionally from about 3% to about 25% by weight of the positive electrode of a barium-based additive which may be chosen from the group consisting of $BaSO_4$, $BaO$, and $Ba(OH)_2$. Additionally, so as to increase the hydrogen permeability of the positive electrode, it may also contain additives that are hydrophobic such as PTFE, polyethylene, polypropylene, and mixtures thereof. These additives may be present in the amount of from about 0.1% to about 3.0% or up to 5.0%. Moreover, other—or the same—additives may also be present for purposes of acting as a lubricant when the positive electrodes are being compacted or placed in the cell containers, and so as to reduce tool wear.

The preparation of positive electrodes according to the present invention generally comprises the steps of:
(a) mixing the manganese dioxide and any of the optional components to form a uniform dry mix;
(b) adding the amount of alkaline electrolyte to be used in the positive electrode composition to the uniform dry mix, and continuing to blend the mix;
(c) if necessary, screening the mix; and in any event forming a uniform moist blended mix;
(d) compacting the blended mix;
(e) granulating the compacted blended mix;
(f) screening the granulated blended mix;
(g) forming pellets from the screened blended mix; and
(h) placing the pellets in the appropriate cell containers for use as positive electrodes in the cells to be manufactured.

Typically, step (g) of forming the positive electrode pellets or annular sleeves is carried out a pressures ranging from about 1000 Newtons per square centimeter ($N/cm^2$) to about 20,000 Newtons per square centimetere ($N/cm^2$).

The above method may optionally be followed by a further step of recompacting the positive electrode pellet(s), after it (they) has (have) been placed in the cell container. The recompaction is generally carried out at the same pressure or within the same pressure range noted above. One or several pellets may be used in a positive electrode for a bobbin cell; FIG. 1 suggests that three pellets may be used in the cell that is illustrated.

What now follows are a number of examples of various cells manufactured in keeping with the present invention, whereby various formulations of unconstrained positive electrodes have been provided and tested, with the results being given in each instance.

EXAMPLE 1

In this case, a standard negative electrode was provided, having the following composition:

| | |
|---|---|
| Pre-Amalgamated Zinc | 54.4% |
| ZnO | 10.0% |
| Gelling Agent | 1.0% |
| Anolyte | 34.6% (9N KOH with 5% ZnO dissolved in it) |

The positive electrode composition was as follows:

| | |
|---|---|
| $MnO_2$ | 84.11% |
| Graphite & Carbon Conductive Additives | 9.35% |
| Electrolyte | 6.54% (9N KOH) |

The total void volume found in the cell was about 2%.

Test cells were assembled in size AA (also known as size LR6). Test results showed that the cells according to the above formulations averaged 375 cycles at a discharge of 420 mAh/day. The cells were discharged into 24 ohms, and ultimately had negative electrode failure.

EXAMPLE 2

The following are the formulations used for the positive and negative electrodes employed in a series of tests to evaluate the effects of balance or ratio between the negative and positive electrode materials of cells having unconstrained positive electrodes in keeping with the present invention. The total void volume of all of these test cells was 0.52 ml, or about 10% of the total cell volume. The test results are detailed below. The negative electrode composition was as follows:

| | |
|---|---|
| Zinc | 56.95 |
| CARBOPOL ® | 0.52 |
| Zinc Oxide | 9.00 |
| 9N KOH, 5% ZnO | 33.53 |

The positive electrode composition was as follows:

| | |
|---|---|
| MnO$_2$ | 79.01 |
| Graphite, Carbon, Ag$_2$O | 13.49 |
| 9N KOH | 6.50 |
| PTFE | 1.00 |

As stated above, a principal feature of the present invention is that the theoretical discharge capacity of the negative electrode is in the range of from 60% to 120% of the theoretical one electron discharge capacity of the MnO$_2$ electrode. In other words, the electrode balance is in the range of 60% to 120%; and it is generally in the range of 70% to 100%.

In order to determine that range, a number of experiments were undertaken, as described below and as illustrated in FIGS. 3 to 8. In each of those Figures, the discharge capacity is on the vertical axis, and is measured in mAh. The horizontal axis shows the number of cycles to which the control and test cells have been subjected, and in each case only six cycles of data are shown.

Figure 3:
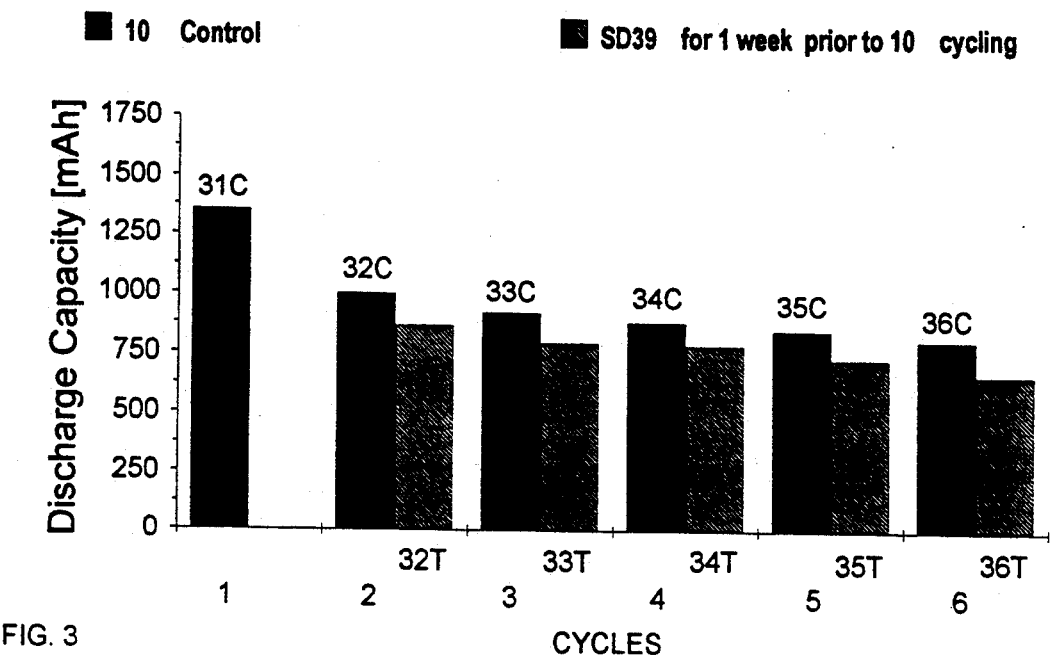
FIGS. 3 to 8 are graphical representations of the capacity of test cells against the capacity of a control cell, where all cells utilize unconstrained MnO$_2$ positive electrodes and have different ratios of the active materials of the positive and negative electrodes from Figure to Figure, and wherein the test cells and the control cells are charged and discharged according to different test regiments.
Figure 4:
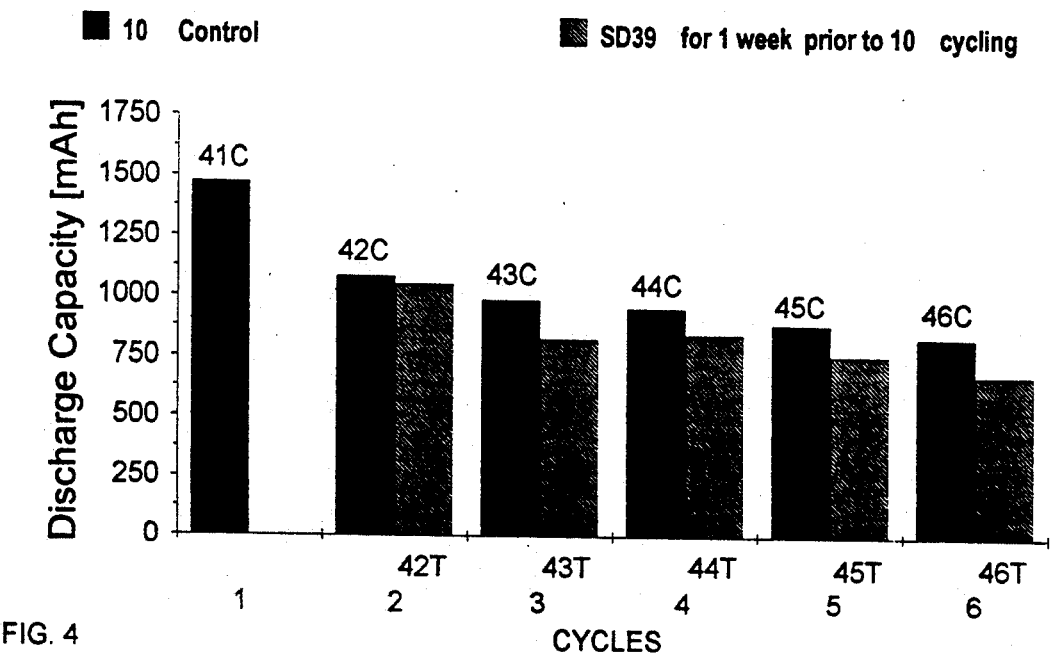
Figure 5:
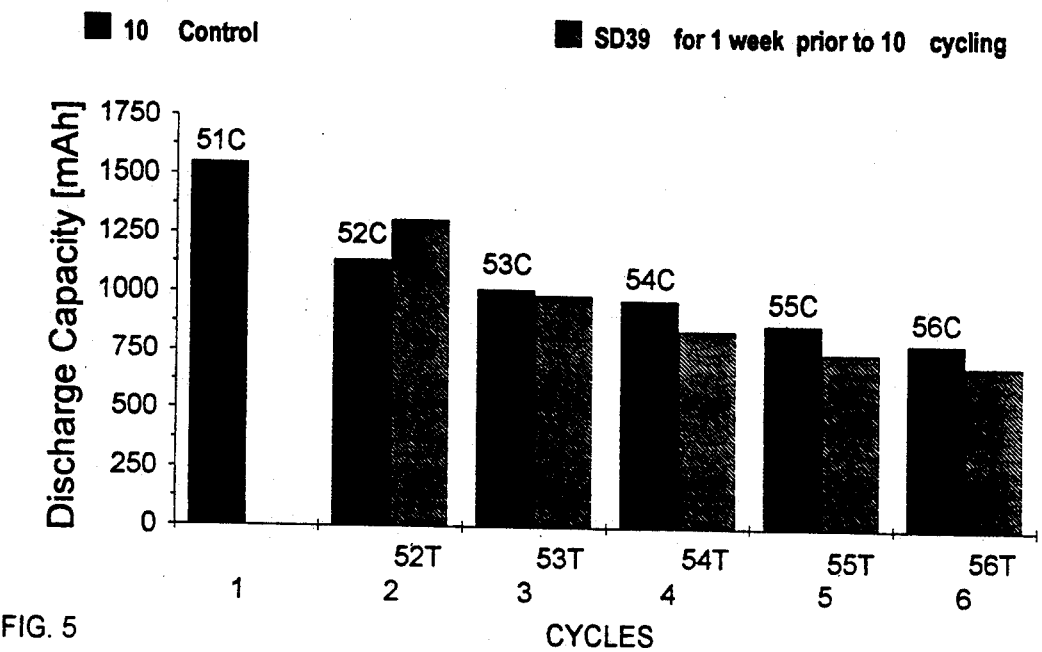
Figure 6:
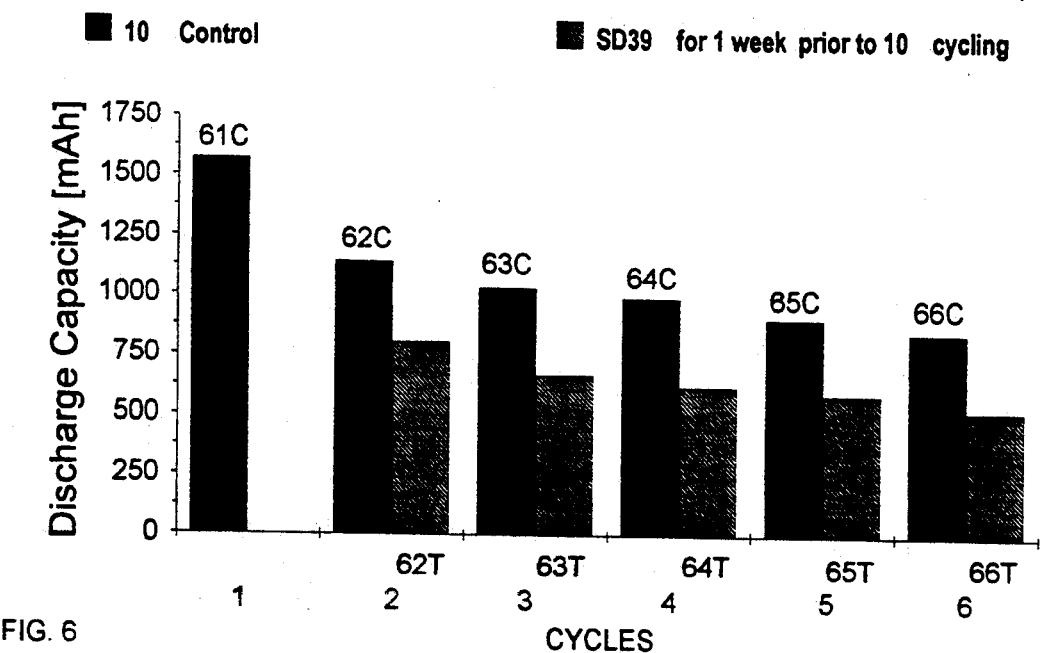
Figure 7:
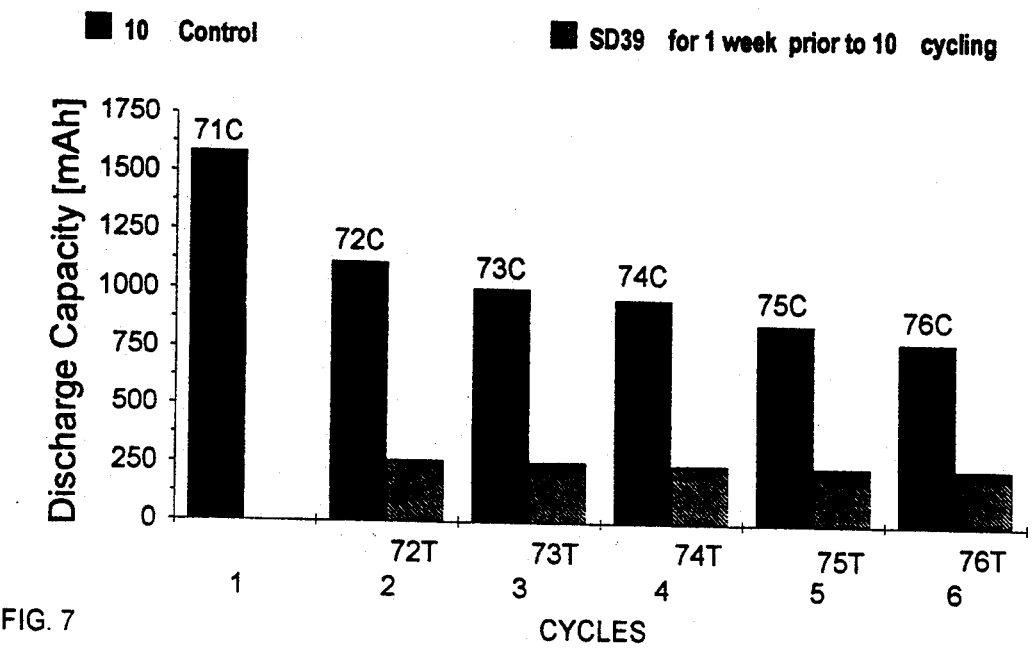
Figure 8:
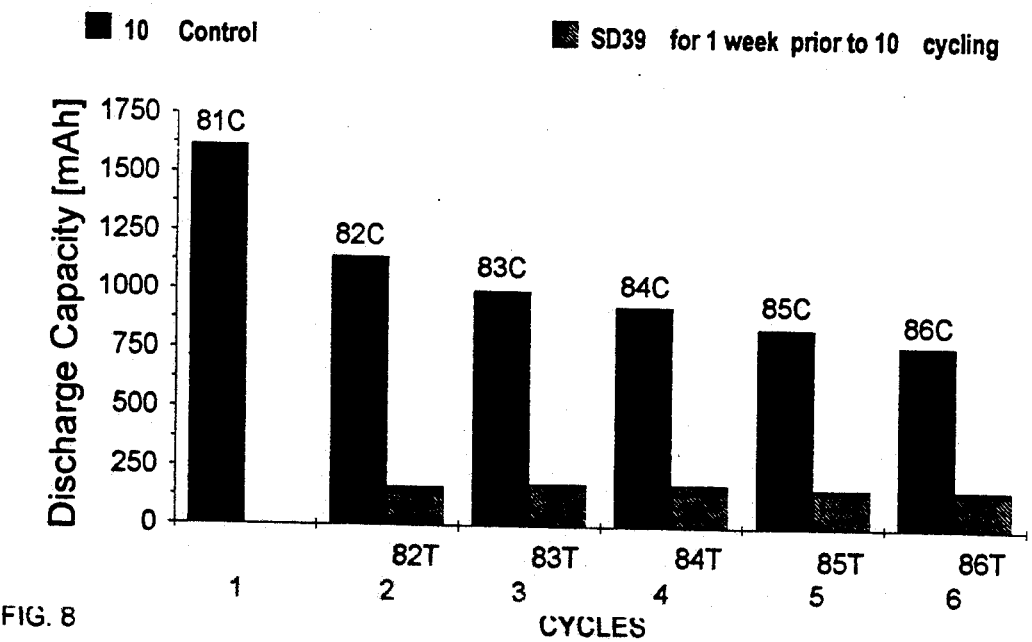

The electrode balance in all of the cells, both test cells and control cells, in FIG. 3 is 80%. Likewise, the electrode balance of cells, both control cells and test cells, of the results shown in FIG. 4 is 90%; the electrode balance of the cells tested in FIG. 5 is 100%; the electrode balance of the cells tested in FIG. 6 is 110%; the electrode balance of the cells tested in FIG. 7 is 120%; and the electrode balance of the cells tested in FIG. 8 is 130%. All of the tests are in respect of cylindrical AA (LR6) alkaline MnO$_2$/Zn cells, and are indicative of the general nature of the effect of electrode balance on the characteristics of rechargeable cells.

The tests were conducted as follows:

A plurality of cylindrical AA alkaline MnO$_2$/Zn cells were manufactured and tested. The cells were eletrode balanced, as discussed above, by limiting the theoretical discharge capacity of the zinc electrode to 80%, 90%, 100%, 110%, 120%, or 130% of the theoretical one electron capacity of the MnO$_2$ electrode of the respective cells.

Then, one set of cells from each of the balance sets as noted above was discharged through a 10 ohm load resistor to a cutoff voltage of 0.9 volts. The results of those discharge tests is the first bar 31C, 41C . . . 71C, 81C in each of FIGS. 3 to 8.

A second group of cells for each balance set of cells was assembled into a battery pack of four cells in series. The battery pack was connected to a 39 ohm load resistor for one week, during which the voltage of each battery pack is effectively reduced to zero. This test emulates a condition such as when a user would have forgotten to switch off a device being powered by the battery pack. The tests demonstrate the necessity for an electrode balance which permits the cells to be recharged and then to be further discharged and charged many times following such abuse.

After the week-long discharge test, each battery pack was dis-assembled, and each of the cells was recharged and then cycled on a ten ohm load to 0.9 volts cutoff, to determine the degree of recovery following the week-long abusive test. Each of the bars marked with a T, such as 32T, 33T . . . 35T and 36T in FIG. 3, 42T . . . 46T in FIG. 4, and so on, in each case shows the results of test cycles 2 through 6, which were run following the week-long abusive test. Each such bar represents an average of four cell tested.

Thus, the results of FIGS. 3 through 8, shown in tabular form, are as follows:

| | Control Cell | Average of Four Test Cells |
|---|---|---|
| FIG. 3 Results: Electrode Balance {Zn:MnO$_2$ 1e$^-$} = 80% Capacity in mAh | | |
| Cycle 1 | 1353 | — |
| 2 | 998 | 862 |
| 3 | 917 | 793 |
| 4 | 870 | 783 |
| 5 | 845 | 728 |
| 6 | 805 | 663 |
| FIG. 4 Results: Electrode Balance {Zn:MnO$_2$ 1e$^-$} = 90% Capacity in mAh | | |
| Cycle 1 | 1473 | — |
| 2 | 1079 | 1048 |
| 3 | 983 | 820 |
| 4 | 948 | 839 |
| 5 | 879 | 753 |
| 6 | 828 | 676 |
| FIG. 5 Results: Electrode Balance {Zn:MnO$_2$ 1e$^-$} = 100% Capacity in mAh | | |
| Cycle 1 | 1547 | — |
| 2 | 1135 | 1310 |
| 3 | 1013 | 989 |
| 4 | 972 | 847 |
| 5 | 873 | 750 |
| 6 | 792 | 696 |
| FIG. 6 Results: Electrode Balance {Zn:MnO$_2$ 1e$^-$} = 110% Capacity in mAh | | |
| Cycle 1 | 1571 | — |
| 2 | 1139 | 800 |
| 3 | 1029 | 665 |
| 4 | 987 | 620 |
| 5 | 903 | 588 |
| 6 | 847 | 524 |
| FIG. 7 Results: Electrode Balance {Zn:MnO$_2$ 1e$^-$} = 120% Capacity in mAh | | |
| Cycle 1 | 1583 | — |
| 2 | 1113 | 262 |
| 3 | 1004 | 257 |
| 4 | 961 | 251 |
| 5 | 860 | 247 |
| 6 | 787 | 244 |
| FIG. 8 Results: Electrode Balance {Zn:MnO$_2$ 1e$^-$} = 130% Capacity in mAh | | |
| Cycle 1 | 1614 | — |
| 2 | 1143 | 165 |
| 3 | 998 | 180 |
| 4 | 933 | 183 |
| 5 | 843 | 167 |
| 6 | 775 | 169 |

From a review of the above tables, and as graphically illustrated in FIGS. 3 through 8, it is evident that up to an electrode balance of somewhat less than 120%, full recovery of the MnO$_2$ electrode in cells which had been discharged in battery packs to about zero volts is observed. At about 120% and above, there is only limited recovery.

Thus, it is apparent that substantially up to an electrode balance of at least 110%, and nearly up to 120%, having regard to the theoretical discharge capacity of the negative electrode with respect to the theoretical one electron discharge capacity of the MnO$_2$ electrode, cells according to the present invention will provide useful capacity, and are rechargeable.

EXAMPLE 3

Finally, cells in keeping with the present invention and having positive electrode and negative electrode compositions as noted below were constructed. All cells contained unconstrained MnO$_2$ positive electrodes. However, one set of AA cells was constructed having an electrode balance of about 42%; and the other set of AA cells was constructed having an electrode balance—i.e., negative electrode to one electron $MnO_2$ discharge capacity ratio—of about 100%. Both cell types had a void volume of about 5% of the total cell volume. Those cells were then subjected to deep discharge cycling at 3.9 Ohms, to a 0.75 volt cutoff. The results of those tests are shown in FIG. 9.

The composition of each of the negative electrodes and positive electrodes was as follows:

| Negative Electrode | |
|---|---|
| Zn, ZnO | 65.00 |
| CARBOPOL ® | 0.50 |
| 9N KOH, 5% ZnO | 34.50 |
| Positive Electrode | |
| $MnO_2$ | 83.03 |
| Graphite, Carbon, $Ag_2O$ | 10.47 |
| 9N KOH | 6.50 |
| PTFE | 1.00 |

Figure 9:
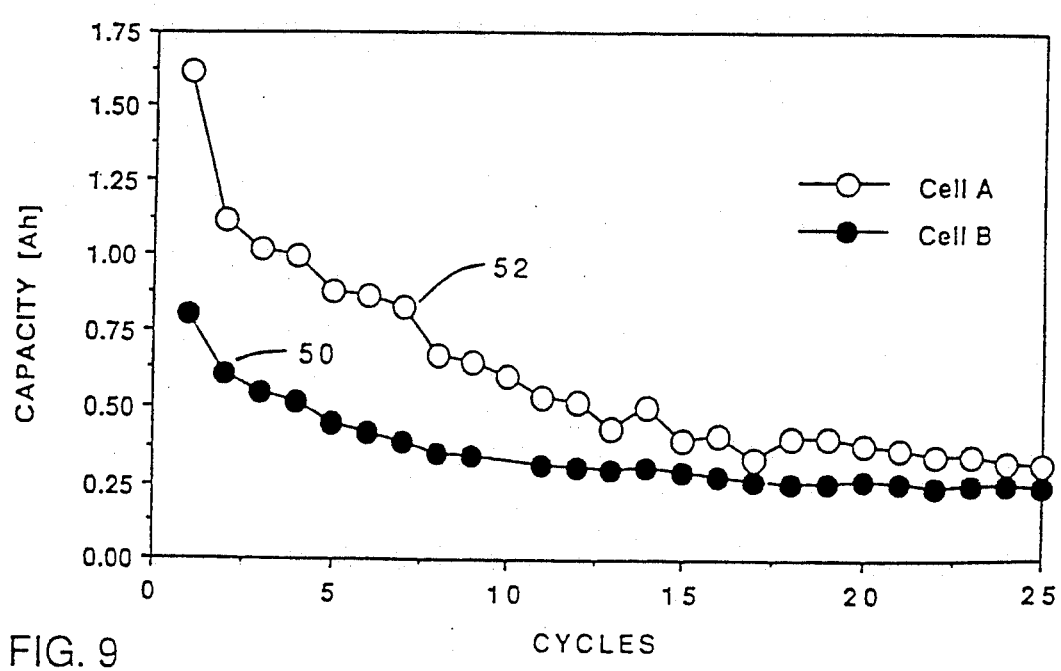
FIG. 9 shows the results of cycling test using deep discharge cycles, for cells utilizing unconstrained MnO$_2$ positive electrodes, but having differing ratios of negative electrode capacity to positive electrode capacity.

It can be seen from FIG. 9 that the cells having an electrode balance of 42% are shown in curve 50; and cells having a negative electrode to one electron $MnO_2$ discharge capacity ratio of 100% are shown in curve 52. The average cell life of the cells shown in curve 50 was only 8 cycles above the 300 mAh capacity cutoff. It will also be noted that the cumulative capacity of the cells in curve 52 for the first 25 cycles was about 15.2 Ah; whereas the cumulative capacity for the first 25 cycles of the cells in curve 50 was only 8.8 Ah. Thus, over the first 25 cycles, the cumulative capacity of cells in keeping with the present invention and having a negative electrode to one electron $MnO_2$ discharge capacity ratio of 100% as compared with cells having a negative electrode to one electron $MnO_2$ discharge capacity ratio of 42%, was exceeded by more than 70%. It was observed that all cells failed due to the zinc electrode, and no failure of the unconstrained $MnO_2$ electrodes was observed.

In general, especially in respect of cells that are placed into cylindrical containers, the container or can 12 is a nickel plated deep drawn steel can, although other suitable metal cans may be used. So as to improve the contact and conductivity between the positive electrode 18 and the can 12, and thereby so as to reduce the internal resistance of the cell, the internal surface of the container 12 may be coated with a conductive coating such as LONZA LGV 1188. Moreover, by using the conductive coating on the interior surface of the container 12, the risk of iron leaching from the can into the cell, which could result in increased hydrogen gassing, is reduced.

When the cell is a typical cylindrical cell, the positive electrode 18 may be placed into the container 12 by such ordinary cell manufacturing techniques as by being molded into discrete pellets and then recompacted after placement in the container 12, or by being extruded into the container.

Moreover, the closure member 22 is normally formed of a thermoplastic material, and contains a safety vent 32 which may be simply a rupturable membrane, or a resealable vent. The plastic closure member is molded from a thermoplastic material such as polypropylene, talc filled polypropylene, polyethylene, polysulfone and nylon.

The present invention has been described above and shown in a variety of examples. It has been noted that in its widest concept, the present invention provides an unconstrained $MnO_2$ positive electrode for use in rechargeable cells, and finds its widest application in rechargeable cells having aqueous alkaline electrolytes. Still further, the present invention finds particular applicability in the circumstances where the theoretical discharge capacity of the negative electrode is in the range of from about 60% up to nearly 120%—and at least in the range of 70% to 100%—of the theoretical one electron discharge capacity of the positive electrode. The invention is applicable to cylindrical cells and to coin or button cells—whether spiral wound or not; and in optional forms the positive electrode of the present invention may have admixed to its formulation such items as fibres (usually conductive fibres), graphite, conductive carbon, barium-based additives, hydrophobic materials, and lubricants.

The scope of the present invention is determined by the accompanying claims.

What is claimed is:

1. A rechargeable electrochemical cell, comprising:
   a container having an inner peripheral surface and a bottom surface;
   a cylindrical zinc negative electrode, centrally disposed within said container;
   an ion conductive aqueous electrolyte disposed within said container;
   an annular manganese dioxide positive electrode disposed within said container, said positive electrode having an outer peripheral surface, an inner peripheral surface, a bottom surface and a top surface;
   a separator disposed within said container between said positive electrode and said negative electrode;
   a closure member disposed over the top of said container and sealing the components disposed therein within said container; and
   terminal means contacting said negative electrode and said $MnO_2$ positive electrode to provide respective negative and positive terminals for said cell;
   wherein the principal active component of said $MnO_2$ positive electrode is manganese dioxide which is capable of being charged and discharged, and wherein the first discharge capacity of said $MnO_2$ electrode, when obtained at a low discharge rate, is essentially the theoretical one electron discharge capacity of said $MnO_2$;
   wherein the principal component of said aqueous electrolyte is chosen from the group consisting of alkaline metal hydroxides, an acid chosen from the group consisting of $H_2SO_4$, $H_3BO_3$, $H_3PO_4$, and mixtures thereof, and a solution of a salt chosen from the group consisting of $ZnCl_2$, $NH_4Cl$, NaCl, KCl, and mixtures thereof;
   wherein said negative electrode is a rechargeable electrode;
   wherein the electrode balance, namely the ratio of the theoretical discharge capacity of said zinc negative electrode with respect to the theoretical one electron discharge capacity of said $MnO_2$ positive electrode, is in the range of from about 60% to about 120%; and
   wherein said positive electrode is restricted from significantly changing its dimensions during cycling by interference at least at its outer periphery with said inner periphery of said container, and further by at least one of interference at its bottom with said container, interference at its inner periphery with said separator, and interference at its top with said closure member.

2. The rechargeable electrochemical cell of claim 1, wherein said electrode balance is in the range of from about 70% to about 100%.

3. The rechargeable electrochemical cell of claim 1, wherein the first discharge capacity of said $MnO_2$ electrode, when obtained at a low discharge rate, is about 308 mAh/g of $MnO_2$ 4. The rechargeable electrochemical cell of claim 1, wherein said negative electrode is zinc, and said electrolyte is 1N to 15N potassium hydroxide.

5. The rechargeable electrochemical cell of claim 4, wherein said electrolyte has a small amount of zinc oxide dissolved in it.

6. The rechargeable electrochemical cell of claim 1, wherein said separator comprises a first layer and a second layer, wherein said first layer is an ion permeable layer, and said second layer is one of an electrolyte absorbent non-woven material and an electrolyte absorbent non-woven fibre reinforced material.

7. The rechargeable electrochemical cell of claim 1, wherein said separator is a laminated separator.

8. The rechargeable electrochemical cell of claim 4, wherein said negative electrode comprises zinc powder mixed with a gelling agent chosen from the group consisting of potassium methacrylate, polymethacrylic acid, carboxymethyl cellulose, starches, and derivatives thereof.

9. The rechargeable electrochemical cell of claim 8, wherein said negative electrode further comprises a small amount of a metallic corrosion inhibitor chosen from the group consisting of lead, cadmium, indium, gallium, bismuth and mercury; and wherein said negative electrode optionally further comprises an organic corrosion inhibitor.

10. The rechargeable electrochemical cell of claim 4, wherein said $MnO_2$ positive electrode further comprises at least one additive chosen from the group consisting of 5% to 15% by weight of graphite, 0.1% to 15% by weight of carbon black, and from 3% to 25% of a barium compound chosen from the group consisting of barium oxide, barium hydroxide, and barium sulphate.

11. The rechargeable electrochemical cell of claim 10, wherein said $MnO_2$ electrode optionally further comprises from 0.01% to 5% of a hydrogen recombination catalyst chosen from the group consisting of silver, oxides of silver, silver salts, platinum, and compounds of silver and platinum.

12. The rechargeable electrochemical cell of claim 10, wherein said $MnO_2$ positive electrode optionally further comprises from about 0.1% to about 5% of a wet proofing agent chosen from the group consisting of PTFE, polyethylene, and polypropylene.

13. The rechargeable electrochemical cell of claim 10, wherein said $MnO_2$ positive electrode optionally further comprises from about 0.1% to about 3% of a wet proofing agent chosen from the group consisting of PTFE, polyethylene, and polypropylene.

14. The rechargeable electrochemical cell of claim 10, wherein said $MnO_2$ positive electrode optionally further comprises from about 0.1% to about 15% of a porous additive chosen from the group consisting of acetylene black, acetylene black which has been rendered hydrophobic, carbon black, and carbon black which has been rendered hydrophobic.

15. The rechargeable electrochemical cell of claim 10, wherein said $MnO_2$ positive electrode optionally further comprises from 0.1% to about 5% of a lubricant chosen from the group consisting of PTFE, polyethylene, polypropylene, metal salts of stearic acid, and polymeric materials which are otherwise benign to the $MnO_2$ and to the electrochemical reaction of zinc and $MnO_2$ in the presence of an aqueous electrolyte.

16. The rechargeable electrochemical cell of claim 10, wherein said $MnO_2$ positive electrode optionally further comprises from 0.1% to about 3% of a lubricant chosen from the group consisting of PTFE, polyethylene, polypropylene, metal salts of stearic acid, and polymeric materials which are otherwise benign to the $MnO_2$ and to the electrochemical reaction of zinc and $MnO_2$ in the presence of an aqueous electrolyte.

17. The rechargeable electrochemical cell of claim 10, wherein said $MnO_2$ positive electrode optionally further comprises from about 0.1% to about 5% by weight of fibre additive, wherein said fibres generally have a length of from about 100 microns up to about 5 centimeters, and are chosen from the group consisting of carbon fibres, graphite fibres, carbon fibres plated with nickel, carbon fibres plated with silver, graphite fibres plated with nickel, graphite fibres plated with silver, copper fibres plated with nickel, and copper fibres plated with silver.

18. The rechargeable electrochemical cell of claim 10, wherein said $MnO_2$ positive electrode optionally further comprises from about 0.1% to about 3% by weight of fibre additive, wherein said fibres generally have a length of from about 100 microns up to about 5 centimeters, and are chosen from the group consisting of carbon fibres, graphite fibres, carbon fibres plated with nickel, carbon fibres plated with silver, graphite fibres plated with nickel, graphite fibres plated with silver, copper fibres plated with nickel, and copper fibres plated with silver.

19. The rechargeable electrochemical cell of claim 1, wherein a conductive carbon based coating is placed on the inside surface of said container.

20. The rechargeable electrochemical cell of claim 19, wherein said coating comprises an aqueous dispersion of graphite and a polyvinylacetate co-polymer.

21. The rechargeable electrochemical cell of claim 4, wherein said $MnO_2$ positive electrode is present in said container in the form of at least one pre-molded pellet.

22. The rechargeable electrochemical cell of claim 4, wherein said terminal means for said negative electrode is electrically connected to a single nail which extends into said negative electrode.

23. The rechargeable electrochemical cell of claim 4, wherein said terminal means for said negative electrode is electrically connected to a current collector in the form of a tube or a split tube or a half-tube.

24. The rechargeable electrochmemical cell of claim 1, wherein said cell is by a closure element which has a safety vent formed therein; and wherein said closure element is made from a material which is chosen from a group of thermoplastic materials consisting of polypropylene, talc filled polypropylene, polyethylene, polysuflfone, and nylon.

25. The rechargeable electrochemical cell of claim 2, wherein said separator is a complex flexible structure which is ion permeable and gas permeable at least to gaseous hydrogen and oxygen, but is impermeable to zinc dendrites.

26. A rechargeable electrochemical cell in the form of a button cell, comprising:

a container having an inner peripheral surface and a bottom surface, a zinc negative electrode disposed within said container;

an ion conductive aqueous electrolyte disposed within said container;

an annular manganese dioxide positive electrode disposed within said container, said positive electrode having an outer peripheral surface, a bottom surface, and a top surface;

a separator disposed within said container between said positive electrode and said negative electrode;

a closure member disposed over the top of said container and sealing the components disposed therein within said container; and terminal means contacting said negative electrode and said $MnO_2$ positive electrode to provide respective negative and positive terminals for said cell;

wherein the principal active component of said $MnO_2$ positive electrode is manganese dioxide which is capable of being charged and discharged, and wherein the first discharge capacity of said $MnO_2$ electrode, when obtained at a low discharge rate, is essentially the theoretical one electron discharge capacity of said $MnO_2$;

wherein the principal component of said aqueous electrolyte is chosen from the group consisting of alkaline metal hydroxides, an acid chosen from the group consisting of $H_2SO_4$, $H_3BO_3$, $H_3PO_4$, and mixtures thereof, and a solution of a salt chosen from the group consisting of $ZnCl_2$, $NH_4Cl$, $NaCl$, $KCl$, and mixtures thereof;

wherein said negative electrode is a rechargeable electrode;

wherein the electrode balance, namely the ratio of the theoretical discharge capacity of said zinc negative electrode with respect to the theoretical one electron discharge capacity of said $MnO_2$ positive electrode, is in the range of from about 60% to about 120%; and wherein said positive electrode is restricted from significantly changing its dimensions during cycling by interference at its outer periphery and at its bottom with said container, and by interference at its top with said separator.

27. The rechargeable electrochemical cell of claim 26, wherein said electrode balance is in the range of from about 70% to about 100%.

28. The rechargeable electrochemical cell of claim 26, wherein the first discharge capacity of said $MnO_2$ electrode, when obtained at a low discharge rate, is about 308 mAh/g of $MnO_2$.

29. The rechargeable electrochemical cell of claim 26, wherein said negative electrode is zinc, and said electrolyte is 1N to 15N potassium hydroxide.

30. The rechargeable electrochemical cell of claim 29, wherein said electrolyte has a small amount of zinc oxide dissolved in it.

31. The rechargeable electrochemical cell of claim 26, wherein said separator comprises a first layer and a second layer, wherein said first layer is an ion permeable layer, and said second layer is one of an electrolyte absorbent non-woven material and an electrolyte absorbent non-woven fibre reinforced material.

32. The rechargeable electrochemical cell of claim 26, wherein said separator is a laminated separator.

33. The rechargeable electrochemical cell of claim 29, wherein said negative electrode comprises zinc powder mixed with a gelling agent chosen from the group consisting of potassium methacrylate, polymethacrylic acid, carboxymethyl cellulose, starches, and derivatives thereof.

34. The rechargeable electrochemical cell of claim 33, wherein said negative electrode further comprises a small amount of a metallic corrosion inhibitor chosen from the group consisting of lead, cadmium, indium, gallium, bismuth, and mercury; and wherein said negative electrode optionally further comprises an organic corrosion inhibitor.

35. The rechargeable electrochemical cell of claim 29, wherein said $MnO_2$ positive electrode further comprises at least one additive chosen from the group consisting of 5% to 15% by weight of graphite, 0.1% to 15% by weight of carbon black, and from 3% to 25% of a barium compound chosen from the group consisting of barium oxide, barium hydroxide, and barium sulphate.

36. The rechargeable electrochemical cell of claim 35, wherein said $MnO_2$ electrode optionally further comprises from 0.01% to 5% of a hydrogen recombination catalyst chosen from the group consisting of silver, oxides of silver, silver salts, platinum, and compounds of silver and platinum.

37. The rechargeable electrochemical cell of claim 35, wherein said $MnO_2$ positive electrode optionally further comprises from about 0.1% to about 5% of a wet proofing agent chosen from the group consisting of PTFE, polyethylene, and polypropylene.

38. The rechargeable electrochemical cell of claim 35, wherein said $MnO_2$ positive electrode optionally further comprises from about 0.1% to about 3% of a wet proofing agent chosen from the group consisting of PTFE, polyethylene, and polypropylene.

39. The rechargeable electrochemical cell of claim 35, wherein said $MnO_2$ positive electrode optionally further comprises from about 0.1% to about 15% of a porous additive chosen from the group consisting of acetylene black, acetylene black which has been rendered hydrophobic, carbon black, and carbon black which has been rendered hydrophobic.

40. The rechargeable electrochemical cell of claim 35, wherein said $MnO_2$ positive electrode optionally further comprises from 0.1% to about 5% of a lubricant chosen from the group consisting of PTFE, polyethylene, polypropylene, metal salts of stearic acid, and polymeric materials which are otherwise benign to the $MnO_2$ and to the electrochemical reaction of zinc and $MnO_2$ in the presence of an aqueous electrolyte.

41. The rechargeable electrochemical cell of claim 35, wherein said $MnO_2$ positive electrode optionally further comprises from 0.1% to about 3% of a lubricant chosen from the group consisting of PTFE, polyethylene, polypropylene, metal salts of stearic acid, and polymeric materials which are otherwise benign to the $MnO_2$ and to the electrochemical reaction of zinc and $MnO_2$ in the presence of an aqueous electrolyte.

42. The rechargeable electrochemical cell of claim 35, wherein said $MnO_2$ positive electrode optionally further comprises from about 0.1% to about 5% by weight of fibre additive, wherein said fibres generally have a length of from about 100 microns up to about 5 centimeters, and are chosen from the group consisting of carbon fibres, graphite fibres, carbon fibres plated with nickel, carbon fibres plated with silver, graphite fibres plated with nickel, graphite fibres plated with silver, copper fibres plated with nickel, and copper fibres plated with silver.

43. The rechargeable electrochemical cell of claim 35, wherein said $MnO_2$ positive electrode optionally further comprises from about 0.1% to about 3% by weight of fibre additive, wherein said fibres generally have a length of from about 100 microns up to about 5 centimeters, and are chosen from the group consisting of carbon fibres, graphite fibres, carbon fibres plated with nickel, carbon fibres plated with silver, graphite fibres plated with nickel, graphite fibres plated with silver, copper fibres plated with nickel, and copper fibres plated with silver.

44. The rechargeable electrochemical cell of claim 26, wherein a conductive carbon based coating is placed on the inside surface of said container.

45. The rechargeable electrochemical cell of claim 44, wherein said coating comprises an aqueous dispersion of graphite and a polyvinylacetate co-polymer.

46. The rechargeable electrochemical cell of claim 29, wherein said separator is a complex flexible structure which is ion permeable and gas permeable at least to gaseous hydrogen and oxygen, but is impermeable to zinc dendrites.

47. The rechargeable electrochemical cell of claim 1, wherein said separator is a microporous separator having pore diameters below 0.2 microns.

48. The rechargeable electrochemical cell of claim 26, wherein said separator is a microporous separator having pore diameters below 0.2 microns.

49. The rechargeable electrochemical cell of claim 4, wherein said $MnO_2$ positive electrode is present in said container in the form of a sleeve which has been extruded directly into said container.

* * * * *